(12) United States Patent
Egan

(10) Patent No.: US 12,034,755 B2
(45) Date of Patent: Jul. 9, 2024

(54) COMPUTATIONALLY ASSESSING AND REMEDIATING SECURITY THREATS

(71) Applicant: International Business Machines Corporation, Armonk, NY (US)

(72) Inventor: Douglas F Egan, Lutz, FL (US)

(73) Assignee: International Business Machines Corporation, Armonk, NY (US)

(*) Notice: Subject to any disclaimer, the term of this patent is extended or adjusted under 35 U.S.C. 154(b) by 584 days.

(21) Appl. No.: 17/204,992

(22) Filed: Mar. 18, 2021

(65) Prior Publication Data

US 2022/0303300 A1    Sep. 22, 2022

(51) Int. Cl.
| | | |
|---|---|---|
| H04L 9/40 | (2022.01) | |
| G06F 18/214 | (2023.01) | |
| G06N 5/048 | (2023.01) | |
| G06N 20/00 | (2019.01) | |

(52) U.S. Cl.
CPC ........ H04L 63/1433 (2013.01); G06F 18/214 (2023.01); G06N 5/048 (2013.01); G06N 20/00 (2019.01); H04L 63/1416 (2013.01); H04L 63/20 (2013.01)

(58) Field of Classification Search
None
See application file for complete search history.

(56) References Cited

U.S. PATENT DOCUMENTS

| | | | |
|---|---|---|---|
| 7,523,504 B2 * | 4/2009 | Shah | H04L 63/20 726/25 |
| 7,671,591 B2 | 3/2010 | Chantz | |
| 7,933,989 B1 * | 4/2011 | Barker | H04L 41/147 709/224 |
| 8,132,260 B1 * | 3/2012 | Mayer | H04L 63/1433 726/25 |

(Continued)

FOREIGN PATENT DOCUMENTS

| | | |
|---|---|---|
| CN | 102339452 A | 2/2012 |
| WO | 200070463 A1 | 11/2000 |

(Continued)

OTHER PUBLICATIONS

Nhlabatsi et al.; Threat-Specific Security Risk Evaluation in the Cloud; IEEE (Year: 2021).*

(Continued)

*Primary Examiner* — Amare F Tabor
*Assistant Examiner* — Mahabub S Ahmed
(74) *Attorney, Agent, or Firm* — David K. Mattheis

(57) ABSTRACT

Computer software that assesses risks for security threat events by that performing the following operations: (i) receiving information pertaining to a managed asset; (ii) identifying, based, at least in part, on the received information: a threat to the managed asset and, one or more corresponding security controls for mitigating the threat, the security controls having associated control criteria; (iii) utilizing a risk assessment engine to calculate a risk value for the threat based, at least in part, on the received information;

(Continued)

(iv) calculating a certainty factor for the threat based, at least in part, on a measure of belief associated with the control criteria; and (v) performing a computer-based remediation action based, at least in part, on the risk value and the certainty factor.

17 Claims, 6 Drawing Sheets

(56) References Cited

U.S. PATENT DOCUMENTS

| | | | | |
|---|---|---|---|---|
| 8,595,845 | B2* | 11/2013 | Basavapatna | H04L 63/1408 713/168 |
| 8,639,646 | B1* | 1/2014 | Presgraves | G05B 23/0283 706/46 |
| 9,569,471 | B2* | 2/2017 | Sharan | G06F 16/212 |
| 10,142,794 | B1* | 11/2018 | Diamanti | H04W 12/126 |
| 10,616,261 | B2* | 4/2020 | Steele | H04L 63/1433 |
| 10,757,127 | B2* | 8/2020 | Schultz | H04L 63/1433 |
| 11,201,890 | B1* | 12/2021 | Coull | G06F 16/9024 |
| 11,276,501 | B1* | 3/2022 | Brook | G16H 40/67 |
| 11,297,080 | B2* | 4/2022 | Murphy | G06F 21/568 |
| 11,297,092 | B2* | 4/2022 | Murphy | H04L 63/1416 |
| 11,328,068 | B1* | 5/2022 | Niedzwiedz | G06F 21/564 |
| 2006/0122873 | A1* | 6/2006 | Minotto | G06Q 10/10 705/2 |
| 2009/0070170 | A1* | 3/2009 | Krishnamurthy | G06Q 40/08 705/7.28 |
| 2010/0063936 | A1* | 3/2010 | Dayasindhu | G06Q 10/06 705/348 |
| 2010/0275263 | A1* | 10/2010 | Bennett | G06F 21/577 345/589 |
| 2011/0087517 | A1* | 4/2011 | Abbott | G05B 23/0283 703/7 |
| 2012/0096558 | A1* | 4/2012 | Evrard | H04L 63/1416 726/25 |
| 2012/0180133 | A1* | 7/2012 | Al-Harbi | H04L 63/1433 726/25 |
| 2012/0216282 | A1* | 8/2012 | Pappu | H04L 63/1408 726/23 |
| 2013/0191919 | A1* | 7/2013 | Basavapatna | H04L 63/20 726/25 |
| 2013/0239175 | A1* | 9/2013 | Sigurdson | G06F 21/35 726/25 |
| 2014/0137257 | A1* | 5/2014 | Martinez | H04L 63/1433 726/25 |
| 2014/0237599 | A1* | 8/2014 | Gertner | H04L 63/1425 726/24 |
| 2014/0366082 | A1* | 12/2014 | Agrawal | H04L 63/1433 726/1 |
| 2015/0106942 | A1* | 4/2015 | Borghetti | G06F 21/51 726/25 |
| 2015/0264061 | A1* | 9/2015 | Ibatullin | H04L 63/145 726/23 |
| 2015/0281278 | A1* | 10/2015 | Gooding | H04L 63/20 726/1 |
| 2016/0094568 | A1* | 3/2016 | Balasubramanian | G06F 9/45558 726/23 |
| 2016/0148251 | A1* | 5/2016 | Thomas | G06N 20/00 705/14.43 |
| 2017/0171231 | A1* | 6/2017 | Reybok, Jr. | H04L 63/1433 |
| 2017/0250953 | A1* | 8/2017 | Jain | G06F 21/552 |
| 2017/0286690 | A1* | 10/2017 | Chari | G06F 21/577 |
| 2017/0323240 | A1* | 11/2017 | Johnson | G06Q 10/04 |
| 2017/0366572 | A1* | 12/2017 | King-Wilson | H04L 63/1433 |
| 2018/0074483 | A1* | 3/2018 | Cruz | G05B 23/0283 |
| 2018/0082059 | A1* | 3/2018 | Bender | H04L 63/1425 |
| 2018/0139227 | A1* | 5/2018 | Martin | H04L 63/1433 |
| 2018/0146004 | A1* | 5/2018 | Belfiore, Jr. | H04L 63/1433 |
| 2018/0205755 | A1* | 7/2018 | Kavi | G06F 21/577 |
| 2018/0295154 | A1* | 10/2018 | Crabtree | H04L 63/1433 |
| 2018/0367561 | A1* | 12/2018 | Givental | G06N 20/00 |
| 2019/0052665 | A1* | 2/2019 | Mahieu | G06N 5/01 |
| 2019/0068624 | A1* | 2/2019 | Compton | H04L 63/1441 |
| 2019/0102689 | A1* | 4/2019 | Lassoued | G07C 5/085 |
| 2019/0155712 | A1* | 5/2019 | Tiwari | G06N 5/00 |
| 2019/0253450 | A1* | 8/2019 | Ahuja | G06F 21/577 |
| 2019/0273749 | A1* | 9/2019 | Nishimoto | G06N 20/20 |
| 2019/0362280 | A1* | 11/2019 | Vescio | G06F 21/577 |
| 2020/0036743 | A1* | 1/2020 | Almukaynizi | G06N 5/048 |
| 2020/0211075 | A1* | 7/2020 | Kumar | G06Q 20/4016 |
| 2021/0021636 | A1* | 1/2021 | Sbandi | H04L 63/1466 |
| 2021/0021644 | A1* | 1/2021 | Crabtree | G06F 16/951 |
| 2021/0037040 | A1* | 2/2021 | Aleks | H04L 63/1433 |
| 2021/0037046 | A1* | 2/2021 | Dhillon | H04L 63/1425 |
| 2021/0075820 | A1* | 3/2021 | Murphy | H04L 67/30 |
| 2021/0103487 | A1* | 4/2021 | Rosales | G06F 11/076 |
| 2021/0218770 | A1* | 7/2021 | Ben-Yosef | G06F 21/554 |
| 2021/0234885 | A1* | 7/2021 | Campbell | H04L 63/1466 |
| 2021/0248289 | A1* | 8/2021 | Fasano | G05B 17/02 |
| 2021/0350001 | A1* | 11/2021 | Alturaifi | G06F 21/57 |
| 2021/0350007 | A1* | 11/2021 | Shih | G06F 21/6218 |
| 2022/0121739 | A1* | 4/2022 | Kawauchi | G06F 21/55 |
| 2022/0407882 | A1* | 12/2022 | Neuvirth | G06F 18/214 |
| 2023/0307143 | A1* | 9/2023 | Brook | G16H 50/70 |
| 2023/0325511 | A1* | 10/2023 | Jaster | G06F 21/577 726/23 |

FOREIGN PATENT DOCUMENTS

| | | | |
|---|---|---|---|
| WO | 200854403 | A2 | 5/2008 |
| WO | 2015094545 | A1 | 6/2015 |

OTHER PUBLICATIONS

Gritzalis et al.; Using formal distributions for threat likelihood estimation in cloud-enabled IT risk assessment; Elsevier (Year: 2018).*

"Foundations of Fuzzy Logic", MathWorks, downloaded from the Internet on Mar. 3, 2020, 11 pages, <https://www.mathworks.com/help/fuzzy/foundations-of-fuzzy-logic.html>.

"List of semiconductor fabrication plants", Wikipedia, 51 pages, This page was last edited on Mar. 2, 2021, <https://en.wikipedia.org/wiki/List_of_semiconductor_fabrication_plants>.

"National Defense Authorization Act for Fiscal Year 2020", One Hundred Sixteenth Congress of the United States of America, Begun and held at the City of Washington on Thursday, the third day of January, two thousand and nineteen, 1119 pages.

"OSCAL: the Open Security Controls Assessment Language", NIST, This page was last updated on Nov. 5, 2019, 2 pages, <https://pages.nist.gov/OSCAL/>.

"Security Content Automation Protocol SCAP", NIST, Information Technology Laboratory Computer Security Resource Center, Created Dec. 7, 2016, Updated Aug. 7, 2020, 3 pages, <https://csrc.nist.gov/projects/security-content-automation-protocol/>.

"TAME: Trusted and Assured MicroElectronics", Working Groups Report, Dec. 2019, 78 pages.

"What is Fair?", From a Compliance-based to a Risk-based Approach to Cyber Risk Quantification and Operational Risk, FAIR Institute, downloaded from the Internet on Mar. 3, 2020, 5 pages, <https://www.fairinstitute.org/what-is-fair>.

Buchanan et al., "Rule-Based Expert Systems: The MYCIN experiments of the Stanford Heuristic Programming Project", Chapter 1, Addition-Wesley, M.A., Oct. 1984, 39 pages.

Maitra et al., "A Hybrid Approach for Handling Uncertainty—Probabilistic Theory, Certainty Factor and Fuzzy Logic", International Journal of Computer Science and Mobile Computing, IJCSMC, vol. 2, Issue. 11, Nov. 2013, p. 70-78.

Reddy, Poli Venkata Subba, "Fuzzy Logic Based on Belief and Disbelief Membership Functions", Fuzzy Inf. Eng. (2017) 9: pp. 405-422, Accepted Mar. 19, 2017, <https://doi.org/10.1016/j.fiae.2017.12.001>.

Waltermire et al., "The Technical Specification for the Security Content Automation Protocol (SCAP)", SCAP Version 1.3, NIST

(56) References Cited

OTHER PUBLICATIONS

Special Publication 800-126 Revision 3, Feb. 2018, 64 pages, <https://doi.org/10.6028/NIST.SP.800-126r3>.
Zeng et al., "Uncertainty theory as a basis for belief reliability", Information Sciences 429 (2018) pp. 26-36, Available online Oct. 31, 2017, <https://doi.org/10.1016/j.ins.2017.10.050>.

* cited by examiner

| MAGNITUDE | LIKELIHOOD | CATEGORY | THREAT | SAMPLE SCENARIO | MIGRATING CONTROL(S) |
|---|---|---|---|---|---|
| SEVERE | ALMOST CERTAIN | DESIGN | ATTACK COMMUNICATION BETWEEN SYSTEM AND EXTERNAL FACILITIES | EAVESDROP, REDIRECT, MODIFY, ETC. | 25 SYSTEM AND COMMUNICATIONS PROTECTION (SC) PRACTICES |

500

502

COMPUTATIONALLY ASSESSING AND REMEDIATING SECURITY THREATS

BACKGROUND

The present invention relates generally to the field of threat management, and more particularly to computationally assessing and remediating risk for security threat events.

In the fields of organizational security and threat management, certain industry standards exist for systematizing best practices and various government requirements. For example, OSCAL (Open Security Controls Assessment Language) provides a standardized representation for different categories of information pertaining to the publication, implementation, and assessment of security controls and requirements, and SCAP (Security Content Automation Protocol) provides a suite of specifications that standardize the format and nomenclature by which security control information is communicated.

SUMMARY

According to an aspect of the present invention, there is a method, computer program product and/or system that performs the following operations (not necessarily in the following order): (i) receiving information pertaining to a managed asset; (ii) identifying, based, at least in part, on the received information: a threat to the managed asset and, one or more corresponding security controls for mitigating the threat, the security controls having associated control criteria; (iii) utilizing a risk assessment engine to calculate a risk value for the threat based, at least in part, on the received information; (iv) calculating a certainty factor for the threat based, at least in part, on a measure of belief associated with the control criteria; and (v) performing a computer-based remediation action based, at least in part, on the risk value and the certainty factor.

DETAILED DESCRIPTION

Figure 1:
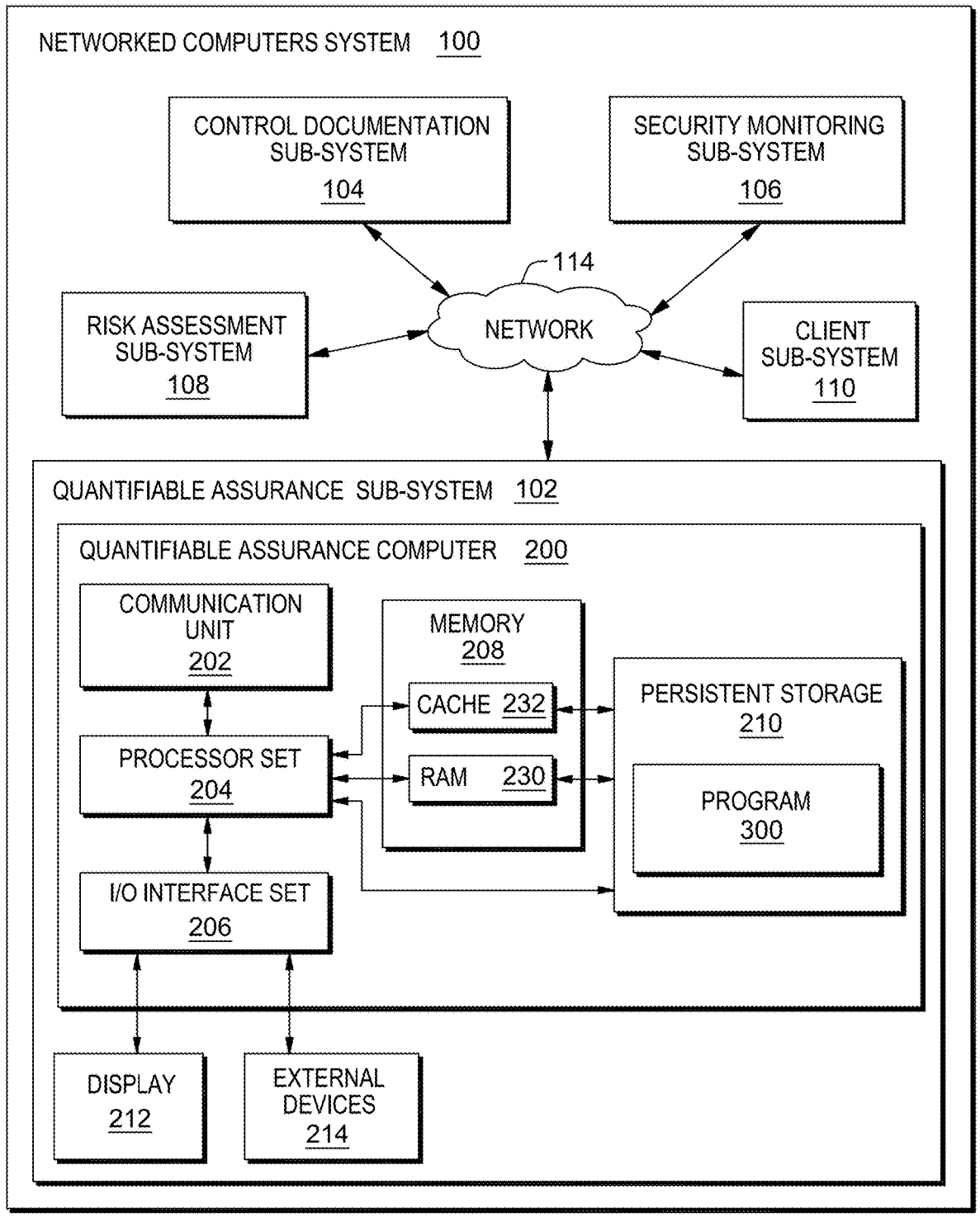
FIG. 1 is a block diagram view of a first embodiment of a system, according to the present invention.

In the field of threat management, assessing the risk of various threats to an asset, such as a computer system or a computer hardware supply chain, can be a complicated process that requires comparing information about the asset to known controls and/or requirements, many of which are standardized and/or established by government entities. Various embodiments of the present invention improve upon existing solutions by utilizing advanced automation and analytics capabilities to predict and identify risks and respond with automated workflow operations, using machine assisted decision tools for broad-based collection, context-based analysis, and adaptive response capabilities. Various embodiments also combine risk assessments with certainty factors based on security control criteria, resulting in risk values and associated certainty factors that can be used in a variety of contexts to assess and improve the security level of an asset.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: quantifiable assurance sub-system 102; control documentation sub-system 104; security monitoring sub-system 106; risk assessment sub-system 108; client sub-system 110; communication network 114; computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
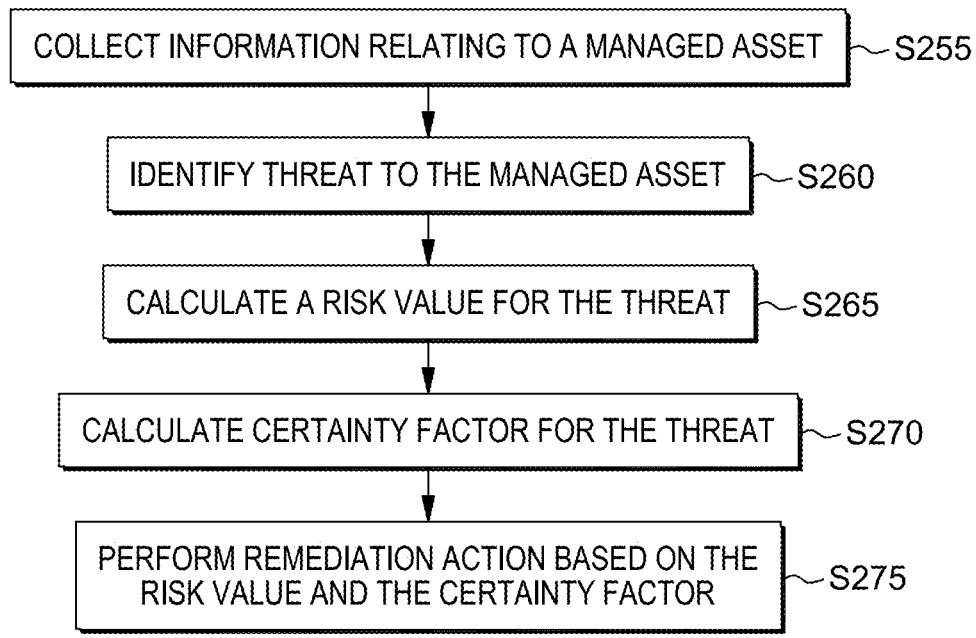
FIG. 2 is a flowchart showing a first embodiment method performed, at least in part, by the first embodiment system.
Figure 3:
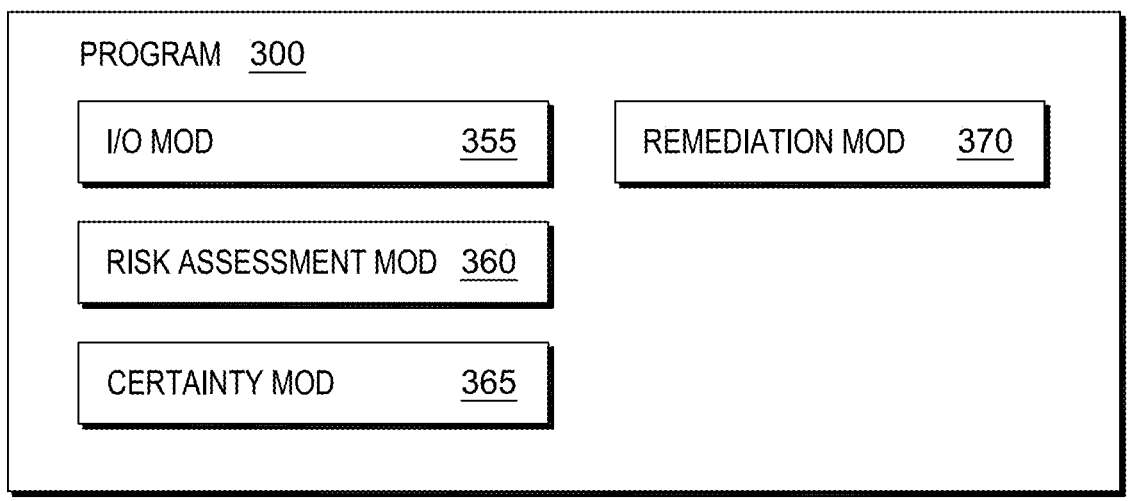
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Generally speaking, in this example embodiment (also referred to in this sub-section as the "present embodiment," the "present example," the "present example embodiment," and the like), program 300 of quantifiable assurance sub-system 102 interacts with risk assessment sub-system 108 (or alternatively, risk assessment mod 360 of program 300) to process information from control documentation sub-system 104 and security monitoring sub-system 106, for the purpose of assessing and remediating/mitigating threats to a managed asset. The managed asset, as described herein, may be any asset capable of being managed by a threat/asset management system, such as a security information and event management (SIEM) system. For example, in some embodiments, the asset is a hardware and/or software asset, such as a computer, a program, a computer network, a cloud computing environment, a cloud container, and/or the like. In other embodiments, the asset is a managed process, such as a microprocessor manufacturing process. In still other embodiments, the asset is a managed supply chain for a manufactured device, such as the supply chain for a microprocessor. It should be noted, however, that these examples are not necessarily meant to be limiting, and that, as stated above, the asset may be anything capable of being managed by a threat/asset management system, known now or to be known in the future.

Processing begins at operation S255, where I/O module ("mod") 355 collects information relating to the managed asset. The information relating to the managed asset may include a wide variety of information either specifically describing features or characteristics of the managed asset and/or information that may be helpful in identifying/assessing threats to the managed asset. For example, in some embodiments, the information includes training information, such as information relating to risk generally, and specific information pertaining to the operational state of the managed asset itself.

The training information generally includes any information that can be used to help a risk assessment engine—such as risk assessment mod 360 and/or risk assessment sub-system 108—to evaluate risk. In many cases, the training information includes information pertaining to known security controls and associated control criteria, such as governance, risks, and compliance (GRC) information including: (i) risk frameworks, which generally cover threats, corresponding mitigation controls, and associated mitigation control criteria and/or compliance requirements; (ii) system security plans; (iii) and system test plans.

In many cases, the training information comes from a plurality of sources—including, for example, control documentation sub-system 104—and is presented in human-readable form, requiring conversion to a format capable of being processed by the risk assessment engine. In these situations, risk assessment mod 360 of program 300 may convert the training information into a standardized format such as the Open Security Controls Assessment Language (OSCAL) format prior to sending the training information to the risk assessment engine.

The information relating to the operational state of the managed asset generally includes information about or relating to the managed asset that can be useful in assessing the threat to the managed asset, such as security monitoring information. For example, the information relating to the operational state of the managed asset may include (i) contact frequency information; (ii) probability of action information; (iii) threat event frequency and capability information; (iv) resistance strength information; and/or (v) loss event frequency and magnitude information.

In many cases, the information relating to the operational state of the managed asset also comes from a plurality of sources—including, for example, security monitoring sub-system 106, which may in some cases include a security information and event management (SIEM). Other sources may include intrusion detection systems (IDSes), vulnerability scanners, database application monitoring (DAM) systems, enforcers from zero trust architecture (ZTA), and/or the like. Furthermore, in some cases, risk assessment mod 360 converts the information received from these sources using a standardized format such as the Security Content Automation Protocol (SCAP).

Processing proceeds to operation S260, where I/O mod 355 identifies a threat to the managed asset based, at least in part, on the received information. The threat may be any of a wide variety of possible threats which, generally speaking, are only limited by the fact that they are able to be tracked/managed by a threat/asset management system. For example, if the asset is a computer or a computer network, the threat may be a specific hardware failure threat, such as the threat of a persistent storage crash or a network switch crash, or a particular security vulnerability that might make the computer/network more susceptible to a hack or other malicious activity. If the asset is a managed process or supply chain, the threat may be, for example, the threat that a malicious actor could gain entry to a portion of the process or supply chain and insert hardware and/or software designed to fulfill some kind of malicious purpose. Still other types of threats include financial threats (events that result in financial liability), legal threats (events that result in legal liability/obligations), and physical threats (events that result in physical harm to an asset), for example.

In many embodiments, identifying the threat to the managed asset also includes identifying one or more corresponding security controls for mitigating the threat—again, based, at least in part, on the received information. For example, if the identified threat is a hardware failure threat, a corresponding security control may require that a backup hardware device be installed to mitigate against the threat of failure. Further, in many cases, the security controls have associated control criteria used to measure how closely the security controls are being met. In the example of requiring a backup hardware device to be installed, example control criteria may be requirements that the backup hardware device have a larger amount of storage than the original hardware device and that an administrative user be given read/write access to the backup hardware device.

In many cases, threats, corresponding security controls, and associated control criteria are defined by standards promulgated by various standards bodies—some examples include International Standards Organization (ISO) standards, such as ISO/IEC 27001, Federal Information Processing Standards (FIPS), such as FIPS 200, National Institute of Standards and Technology (NIST) standards, such as NIST SP-800-53, and others. (Note: the terms "ISO," "FIPS," and "NIST" may be subject to trademark rights in various jurisdictions throughout the world and are used here only in reference to the products or services properly denominated by the marks to the extent that such trademark rights may exist.)

Processing proceeds to operation S265, where risk assessment mod 360 calculates a risk value for the threat to the managed asset. In many cases, the risk value is determined by a risk management engine located either within mod 360 or somewhere outside of quantifiable assurance sub-system 102 (such as at risk assessment sub-system 108), using known risk assessment methods/frameworks and/or methods/frameworks yet to be known in the future. For example, as is discussed in further detail below, in the Further Comments and/or Embodiments sub-section of this Detailed Description, the risk assessment may be performed by an Open Group Factor Analysis of Information Risk (FAIR) engine, which determines risk according to the FAIR methodology. (Note: the term "FAIR" may be subject to trademark rights in various jurisdictions throughout the world and is used here only in reference to the products or services properly denominated by the mark to the extent that such trademark rights may exist.)

In various embodiments, the risk assessment engine receives, as input, the two types of information mentioned above: the training information and the information relating to the operational state of the managed asset. In various embodiments, where the risk assessment engine includes a machine learning and/or neural network component, the training information is used to train the machine learning and/or neural network component, using a training process, to generate risk scores (or "values"). In one example, the risk assessment includes a neural network, the training information is divided into example inputs and example results, and the example inputs and example results are fed to the neural network for backpropagation-based training. In another example, the training information is combined with other information from other sources—such as information from the asset itself—to train the model in a way that is more particularly tailored to the specifics of the managed asset. A result of the training may be a trained model capable of generating risk scores based on receiving, as input, information relating to the operational state of the managed asset.

In some cases, a first subset of information—containing, for example, the training information—is sent to the risk assessment engine at the same time as a second subset of information—containing, for example, the information relating to the operational state of the managed asset. In other cases, the first subset of information is sent to the risk assessment engine first, for training purposes, and then upon completion of the training, the second subset of information is sent to the risk assessment engine for processing.

In various embodiments, in operation S265, risk assessment mod 360 and/or risk assessment sub-system 108 generate three risk values: vulnerability (Vuln), threat event frequency (TEF), and loss event frequency (LEF). These risk values will be described below in the Further Comments and/or Embodiments sub-section of this Detailed Description.

Processing proceeds to operation S270, where certainty mod 365 calculates a certainty factor for the threat. The certainty factor can be calculated in any of a wide variety of ways, using much of the same information used in generating the risk value, with the certainty factor generally serving as a measure of accuracy of the risk value, even when the certainty factor is not based on the risk value itself. Several such examples for calculating the certainty factor can be found in the further Comments and/or Embodiments sub-section of this Detailed Description, below.

In various embodiments, the certainty factor is based, at least in part, on a measure of belief associated with the control criteria for the security controls. For example, in the present example embodiment, certainty mod 365 calculates the certainty factor based, at least in part, on a two-fold fuzzy set, where the two-fold fuzzy set includes a membership function for belief of the control criteria and a membership function for disbelief of the control criteria. In this embodiment, the calculating of the certainty factor further includes calculating the measure of belief associated with the control criteria based, at least in part, on the membership function for belief of the control criteria; calculating a measure of disbelief associated with the control criteria based, at least in part, on the membership function for disbelief of the control criteria; and calculating a difference between the measure of belief for the control criteria and the measure of disbelief for the control criteria, where the difference is used as the certainty factor. Further, in some embodiments, the certainty factor is further based, at least in part, on measures of belief and disbelief in contact frequency and probability of action factors, in addition to the control criteria.

In various embodiments, a certainty factor is calculated for each control criterion of the control criteria associated with the security controls for mitigating the threat. In various embodiments, certainty factors are attached to all propositions and are associated with all implications of a particular control.

In various embodiments, a cumulative security factor (also referred to as a "quantifiable assurance value" or "quantifiable assurance score") is compiled at the security control level or at the threat level, by adding, multiplying, averaging, or otherwise combining the certainty factors for each of the respective control criteria. In various embodiments, the quantifiable assurance value is calculated based on the risk value, the loss event frequency value, and on a certainty factor specifically for the loss event frequency value. In some embodiments, the quantifiable assurance value is a value from the following set of values: (i) 1 Extreme, (ii) 2 Severe, (iii) 3 High, (iv) 4 Significant, (v) 5 Moderate, (vi) 6 Low, and (vii) 7 Very Low. In these (and other) embodiments, the lower the quantifiable assurance value, the greater the need to add mitigation measures.

Processing proceeds to operation S275, where remediation mod 370 performs a computer-based remediation action based, at least in part, on the risk value and the certainty factor. Many of a wide variety of known (or yet to be known) remediation actions may be taken, depending, for example, on the threat and its corresponding risk value and certainty factor(s). In some cases, for example, the remediation action may involve making changes to the asset and/or its surrounding conditions to raise the risk score, certainty factor(s), and quantifiable assurance score to an acceptable amount. In other cases, the remediation action may involve informing a user (e.g., via a dashboard, or email) that their risk score, certainty factor(s), and/or quantifiable assurance score are below a threshold over which they would need to be to meet a contractual and/or legal obligation. In still other cases, the remediation action may involve collecting additional information about the asset and recalculating the risk score, certainty factor(s), and quantifiable assurance score to determine whether the additional information improved the result.

In various embodiments, including embodiments discussed below in the Further Comments and/or Embodiments sub-section of this Detailed Description, when a quantifiable assurance value (i.e., a value based on the risk value and the certainty factor) is below a particular threshold, remediation mod 370 analyzes the asset and its surrounding conditions and determines additional controls that would reduce the TEF and Vuln, as any action that reduces the TEF and Vuln will inherently reduce the LEF and thereby reduce loss exposure.

As just a simple example, a computer may be determined to have a comparatively low quantifiable assurance score based on a threat of a network-based malware attack. In response to the quantifiable assurance score being below a certain level, remediation mod 370 analyzes the computer and its surrounding conditions, determines that closing a particular network port would result in an increased score, and automatically closes that port to network traffic by sending a request to a web application firewall (WAF) associated with the asset.

Many existing security controls have elements that can automated. For example, NIST SP 800-53r5 includes many automatable security controls, including at least: (i) 13 Access Control (AC) controls; (ii) 3 Assessment, Authorization, and Monitoring (CA) controls; (iii) 13 Audit and Accountability (AU) controls; (iv) 12 Configuration Management (CM) controls; (v) 4 Contingency Planning (CP) controls; (vi) 4 Identification and Authentication (IA) controls; (vii) 9 Incident Response (IR) controls; (viii) 2 Maintenance (MA) controls; (ix) 1 Media Protection (MP) control; (x) 9 Physical and Environmental Protection (PE) controls; (xi) 1 Program Management (PM) control; (xii) 2 Personally Identifiable Information Processing and Transparency (PT) controls; (xiii) 3 Risk Assessment (RA) controls; (xiv) 3 System and Services Acquisition (SA) controls; (xv) 3 System and Communications (SC) controls; and (xvi) 17 System and Information Integrity (SI) controls. Various embodiments of the present invention perform automated, computer-based remediation actions based on these controls, several examples of which will now be discussed.

For [RA-03 (03)], Dynamic Threat Awareness, threat awareness information is gathered and fed into quantifiable assurance sub-system 102 and/or risk assessment sub-system 108, which analyze the current cyber threat environment on an ongoing basis and ensure procedures are updated in response to the changing threat environment. For example, in various embodiments, when the quantifiable assurance value is low, remediation mod 370 sends a request to change the privilege or authentication thresholds required to perform certain operations.

For [AC-04 (03)], Dynamic Information Flow Control, in various embodiments, based on changes in the threat environment, and detection of potentially harmful or adverse events, remediation mod 370 sends a request to an information flow control system to allow or disallow information flow.

For [IA-02 (13)], Out-of-Band Authentication, in various embodiments, if new threat indicators or an elevated threat level are detected, remediation mod 370 sends a request to implement an out-of-band authentication mechanism for an individual or group of users.

For [SI-14], Non-Persistence, in various embodiments, when advanced persistent threat (APT) attack event frequency increases, remediation mod 370 sends a request to implement non-persistent system components and services to a known state and terminate upon end of session of use, reducing the targeting capability of adversaries. Non-persistent services can be implemented by using virtualization techniques as part of virtual machines or as new instances of processes on physical machines (either persistent or non-persistent).

It should also be noted that one factor that can have a major effect on a quantifiable assurance value for an asset is a system security plan (SSP), which generally identifies all of the security requirements for an organization. Changes to an SSP, such as additional compliance requirements, may have a profound effect on the cybersecurity framework that manages information technology (IT) control requirements. As such, in various embodiments, the remediation action performed by remediation mod 370 may include implementing system-wide changes based on specific changes to an SSP, or even, in certain situations, recommending and/or determining proposed modifications to the SSP to ensure a comparatively high quantifiable assurance value.

In various embodiments, as described above, the remediation action is performed automatically, in response to the risk score, certainty factor(s), and/or quantifiable assurance score being over/under a certain value. In other cases, potential remediation actions are displayed to a user and performed only in response to a user selection via a user interface.

Figure 4:
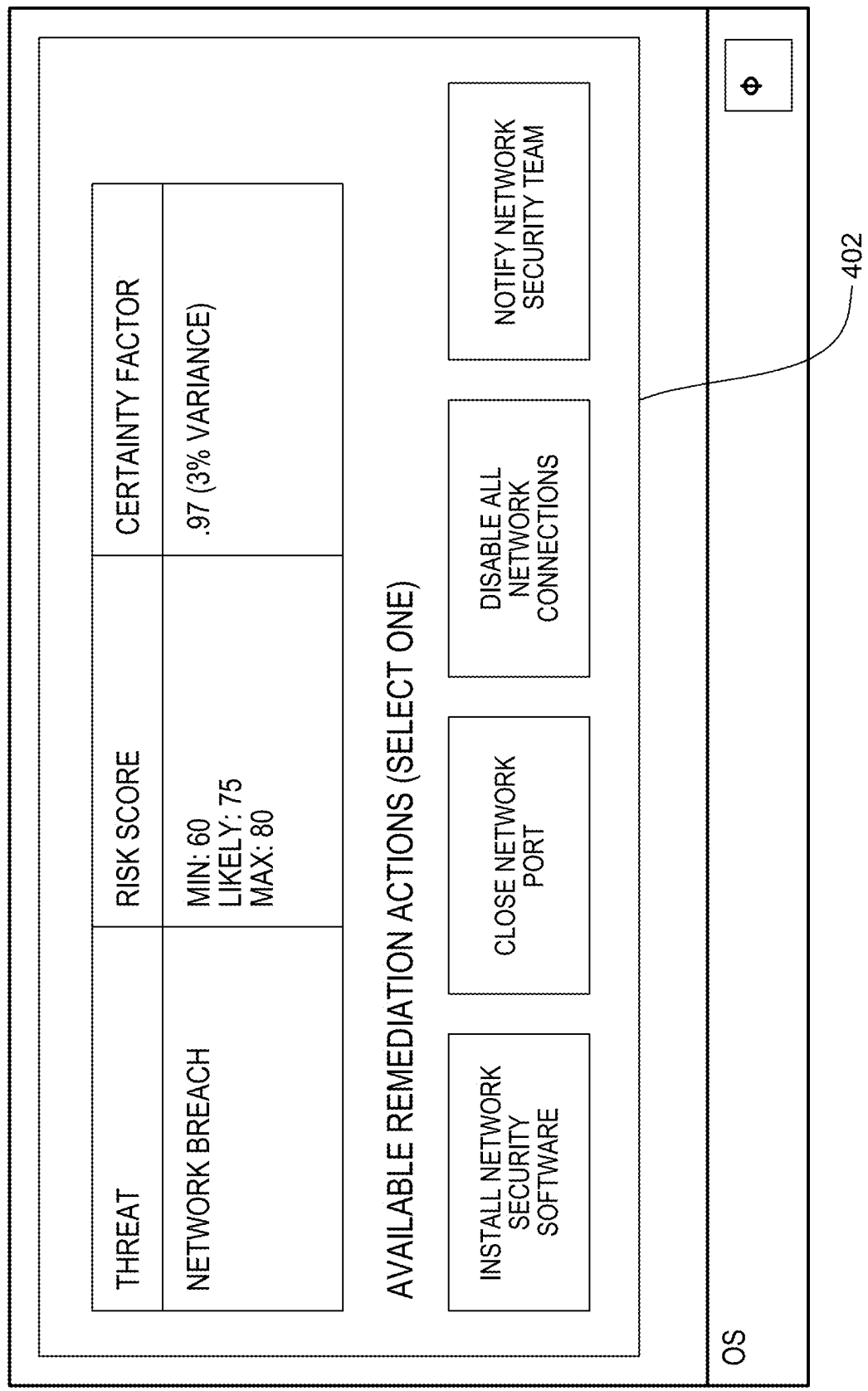
FIG. 4 is a screenshot view generated by the first embodiment system.

FIG. 4 is a screenshot view generated by the first embodiment system. As shown in FIG. 4, screenshot 400 includes interface 402 displayed on a user's computer (e.g., client sub-system 110), where interface 402 depicts an example of a threat, the associated risk score and certainty factor for the threat, and corresponding remediation actions available for selection by the user. In the example depicted in FIG. 4, risk assessment mod 360 has determined that the threat of a network breach has a risk score of "Min: 60, Likely: 75, and Max: 80," and certainty mod 365 has determined that the threat of a network breach has a certainty factor of 0.97, which provides a variance of +/−3% to the risk score. Because the threat has a threshold risk score of 82 (not shown), and the variance of 3% would put the maximum risk score at 83, remediation mod 370 determines that remediation is required. As a result, remediation mod 370 displays four possible remediation actions for user selection: (i) install network security software, (ii) close network port, (iii) disable all network connections, and (iv) notify network security team.

III. Further Comments and/or Embodiments

Various embodiments of the present invention calculate quantifiable assurance (QA) for threat events within an information technology (IT) system. Various embodiments recognize that the trustworthiness of an IT system cannot be achieved without such a quantifiable level of assurance measurement against the controls used in the IT system. Various embodiments of the present invention also recognize that the security implemented in any IT system design should be quantifiable as a continuous or discrete value to make it possible to measure the security level and compare it with the security level of alternative designs.

One application for embodiments of the present invention is in the field of microelectronics fabrication. In this field, for example, many of the semiconductor fabrication plants around the world are on the U.S. Department of Commerce's Denied Persons List, and many discovered CPU hardware exploits have been "baked into" the processor architecture during the microelectronics manufacturing process. Various embodiments of the present help mitigate these types of threats by providing a quantifiably assured microelectronics development platform for silicon CMOS (complementary metal-oxide-semiconductor) integrated circuits and System-on-a-Chip microcircuit manufactures. These embodiments provide a verified end-to-end QA approach for implementing a trusted microelectronics supply chain and meeting operation security standards, such as those required by the U.S. and other governments.

Various embodiments of the present invention recognize that trust issues at the printed circuit board (PCB) level due to vulnerabilities inserted either during the design or fabrication stage or in an untrusted supply chain, are an emerging area of trusted hardware design and verification. Threats are increasingly targeting firmware and hardware-level attacks occurring in the supply chain. In addition, supply chain routers, flash drives, and other electronic devices have been reported as being compromised while in transit to their destination. Semiconductor companies need to work with companies across their supply chain to understand the implications of vulnerabilities and possible solutions at multiple levels—from the integrated circuit to microcode to software.

Furthermore, many entities, including the U.S. Government, require various microelectronics products and services to meet trusted supply chain and operational security standards. A trusted supply chain and operational security standard is a standard that systematizes best practices relevant to: manufacturing location; company ownership; workforce composition; access during manufacturing; suppliers' design, sourcing, manufacturing, packaging, and distribution processes; reliability of the supply chain, and other matters germane to supply chain and operational security.

Various embodiments of the present invention automate the process of calculating loss (e.g., monetary loss) utilizing the Open Group Factor Analysis of Information Risk (FAIR) methodology, receiving metrics from various sources in a standardized format (such as a NIST standard format), and ultimately calculating a quantified risk value for a threat. Various embodiments combine this quantified risk value with a certainty factor (CF).

Various embodiments of the present invention provide a verified, end-to-end QA approach to threat management, where QA is defined as a function of risk data, monetary estimate of future loss, and a CF measuring a likelihood of the risk data and monetary estimates of future loss being accurate.

In various embodiments, the CF is determined by a hybrid approach of probability theory and a certainty factor using fuzzy logic, by first checking the input data for transitivity. The CF is a numeric value, between −1.0 and +1.0, which identifies how likely an event, or a statement, is true. A −1.0 value suggests that the statement can never be true in any situation, and a +1.0 value defines that the statement can never be false.

In various embodiments, fuzzy logic (FL) focuses on the degree to which an event is true and is used to handle uncertainty arising from vagueness and imprecision. FL starts with the concept of a fuzzy set. A fuzzy set is a set without a crisp, clearly defined boundary. For example, a fuzzy set can contain elements with only a partial degree of membership.

In various embodiments, risk data is the aggregation of a variety of cybersecurity control solution metrics used to calculate risk, such as those used in the FAIR methodology (e.g., Threat Capability (TCap), Vulnerability (Vuln), Resistance Strength (RS), Control Strength (CS), etc.). For example, FAIR provides a model for understanding, analyzing, and quantifying cyber risk and operational risk in financial terms. FAIR is unlike risk assessment frameworks that focus their output on qualitative color charts or numerical weighted scales, and builds a foundation for developing a robust approach to information risk management.

In various embodiments, loss is the probable monetary magnitude of loss resulting from an event. For example, an asset's loss potential stems from the value it represents and/or the liability it introduces to an organization. FAIR further decomposes risk by breaking down different factors that make up probable frequency and probable loss that can be measured in a quantifiable number. These factors include, for example: (i) Threat Event Frequency, (ii) Contact Frequency, (iii) Probability of Action, (iv) Vulnerability, (v) Threat Capability, (vi) Difficult, (vii) Loss Event Frequency, (viii) Primary Loss Magnitude, (ix) Secondary Loss Event Frequency, (x) Secondary Loss Magnitude, and (xi) Secondary Risk.

In various embodiments, the overall QA for a threat can be calculated according to the following formula:

$$QA=CF+(FAIR<<OSCAL+SCAP) \quad \text{Quantifiable Assurance Formula}$$

As shown, in these embodiments, QA is the result of both the Quantified Risk value (calculated using the FAIR methodology) and the Certainty Factor (CF) of the accuracy of the quantification of operational risk. The factors required to calculate FAIR probable frequency and probable loss are provided by data from components of the system, communicating via NIST Security Content Automation Protocol (SCAP) and system specific data-centric security metrics communicated in NIST Open Security Controls Assessment Language (OSCAL).

Figure 5:
FIG. 5 is a table view depicting an example of a threat event, according to an embodiment of the present invention.
Figure 5:
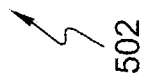

In various embodiments, QA is calculated for every Threat Event (TE) identified in a Risk Management Threat Assessment process. FIG. 5 is a table view depicting an example of a TE according to an embodiment of the present invention. As shown in FIG. 5, table 500 includes threat event 502, having a magnitude of "Severe," a likelihood of "Almost Certain," a category of "Design," a threat of "Attack communication between System and external facilities," a sample scenario of "Eavesdrop, redirect, modify, etc.," and mitigating controls of "25 System and Communications Protection (SC) practices."

Figure 6:
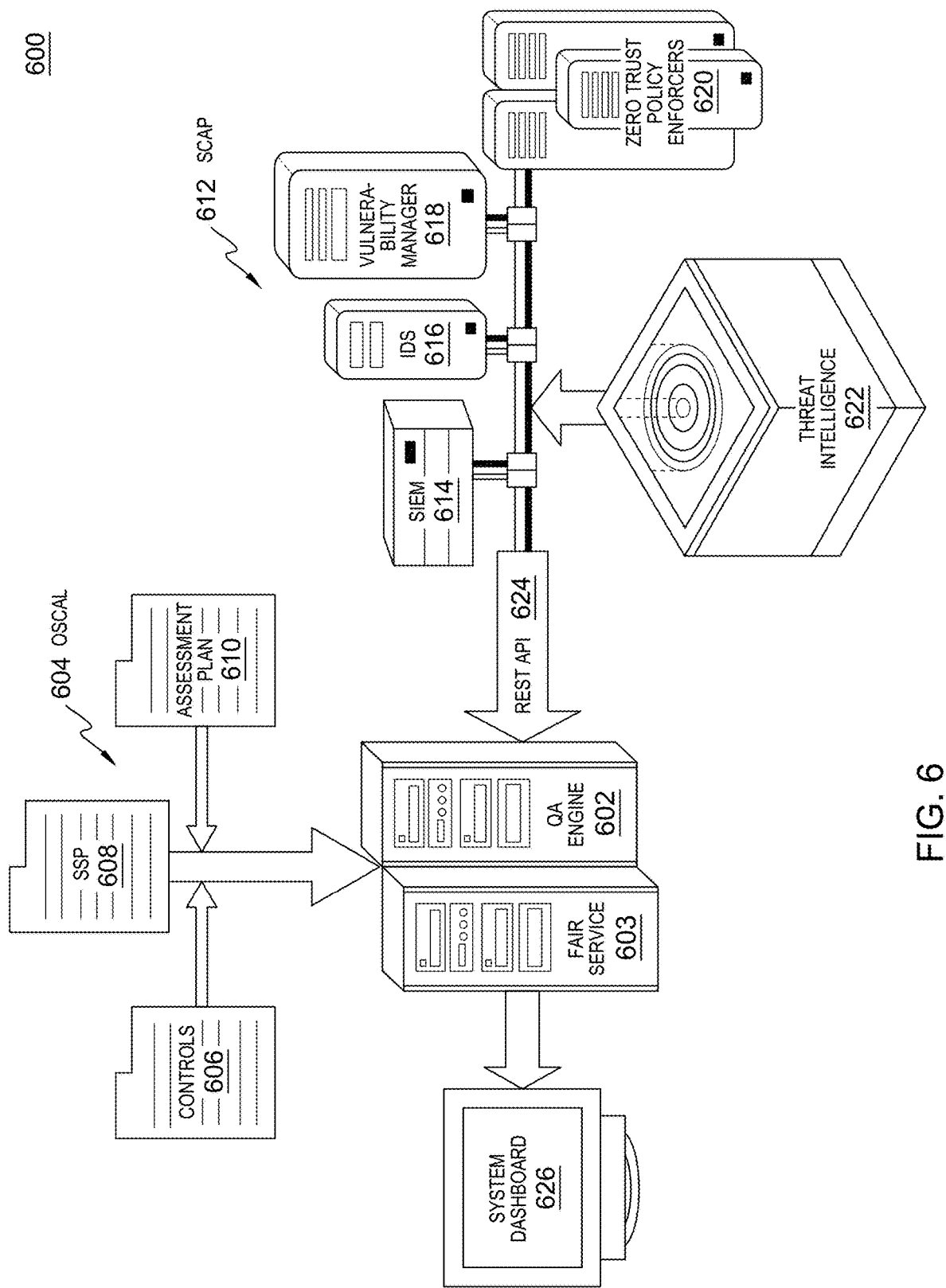
FIG. 6 is a block diagram view depicting a computer architecture for processing a threat event, according to an embodiment of the present invention.

FIG. 6 is a block diagram view depicting a computer architecture for processing a threat event, according to an embodiment of the present invention. As shown in FIG. 6, system 600 includes QA engine 602; FAIR service 603; OSCAL portion 604, which includes controls 606, SSP 608, and assessment plan 610; SCAP portion 612, which includes SIEM 614, IDS 616, vulnerability manager 618, zero trust policy enforcers 620; threat intelligence 622, and REST API 624; and system dashboard 626.

QA engine 602 is a software web service that is used to collect, aggregate, and process the data for calculating quantified risk, utilizing FAIR service 603, and determine the certainty factor of the result. In this embodiment, communication with the supporting components is established via the REST API protocol.

SIEM (Security Information and Event Management) system 614 collects security metrics and metadata from various security control solution devices and forwards the communications to QA engine 602.

To accurately process the inputs QA engine 602 receives, QA engine 602 needs to understand information including: the requirements of the system in scope, threats, and control mitigations. This understanding is established by absorbing information (e.g., security requirements, control solutions, threats, and mitigations, etc.) delivered in a standard format. For example, OSCAL (Open Security Controls Assessment Language) provides a standardized representation for different categories of information pertaining to the publication, implementation, and assessment of security controls and requirements. More specifically, OSCAL includes a set of formats expressed in SML, JSON, and YAML that provide machine-readable representations of control catalogs, control baselines, system security plans, and assessment plans and results.

Referring back to FIG. 6, OSCAL portion 604 includes an OSCAL workflow for directly converting human-oriented documentation into machine-readable format prior to sending to QA engine 602 for processing. In an example, a set of human-oriented documentation includes: (i) control documentation (i.e., controls 606), (ii) baseline documentation, (iii) a system security plan (i.e., SSP 608), (iv) a test plan (i.e., assessment plan 610), and (v) audit results. For the control documentation, the OSCAL workflow includes selecting one or more appropriate catalogs of controls, such as NITST 800-53r5, COBIT 5, ISO/IEC 27001/2, and/or the like, resulting in a machine-readable catalog/framework. For the baseline documentation, the OSCAL workflow may include selecting an appropriate existing baseline and tailoring the selected baseline for implementation, or it may include creating a custom baseline, resulting in a machine-readable baseline profile. For the system security plan, the OSCAL workflow includes aligning and implementing the baseline against OSCAL-enabled system components and addressing any related gaps, resulting in a machine-oriented implementation plan. For the test plan, the OSCAL workflow includes identifying and using questionnaires and automated tests to demonstrate compliance (e.g., OCIL and/or SCAP compliance), resulting in a machine-readable assessment. For the audit results, the OSCAL workflow includes producing automated audit results based on the test plan and assessed implementation, resulting in machine-readable assessment results. Once the OSCAL workflow has completed processing, QA engine 602 processes the results, including the control solution framework, configuration profiles, security requirements, test plan and results, and any other required information from security devices.

SCAP (Security Content Automation Protocol) provides a suite of specifications that standardize the format and nomenclature by which security control information is communicated. An example of an implementation of SCAP is OpenSCAP.

Referring back to FIG. 6, SCAP portion 612, which includes SIEM 614, IDS 616, vulnerability manager 618, zero trust policy enforcers 620, and threat intelligence 622, produces a data stream expressed in XML and delivered to QA engine 602 via REST API 624.

Figure 7:
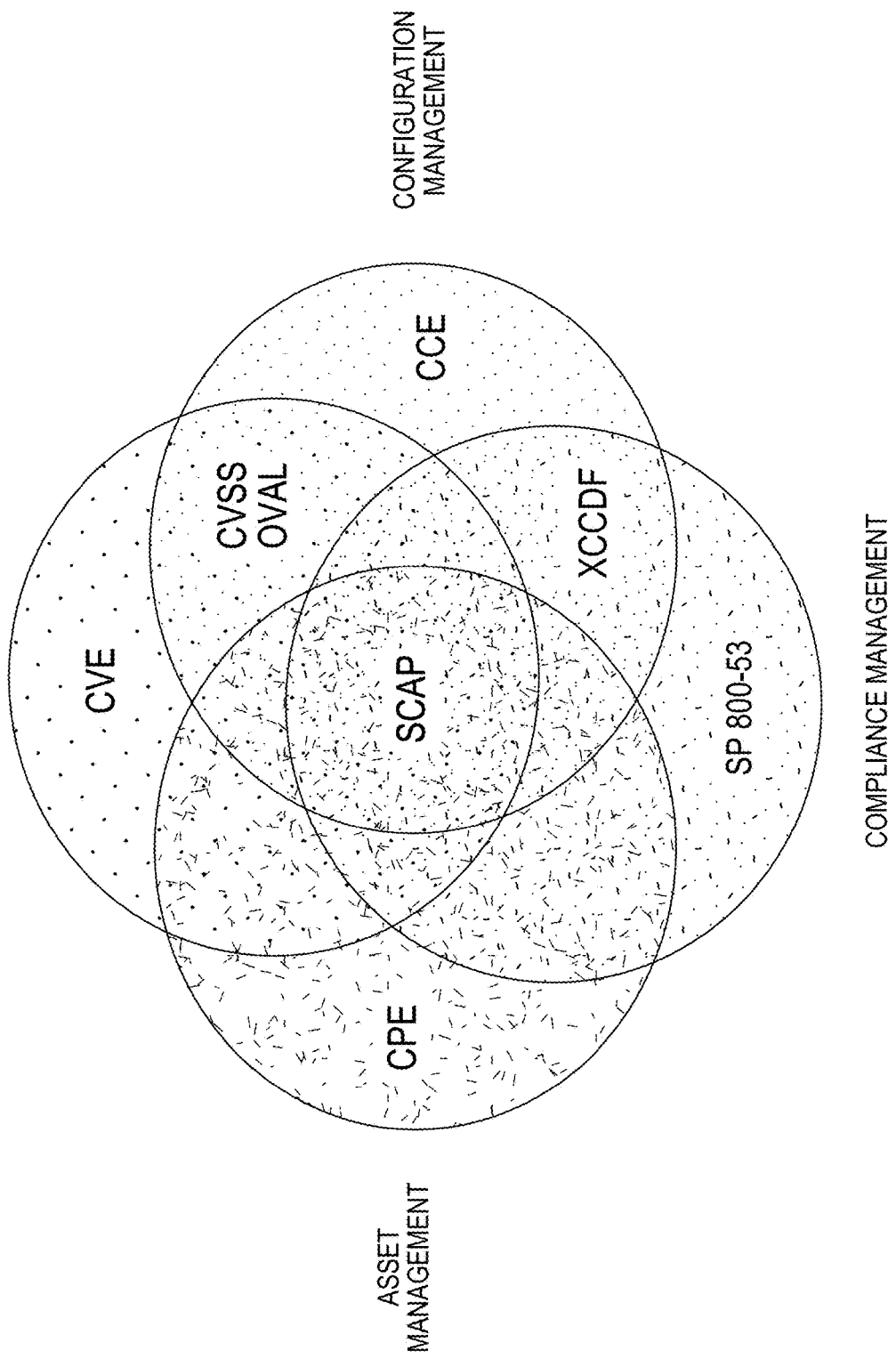
FIG. 7 is a diagram view depicting the utilization of various NIST specifications for SCAP (Security Content Automation Protocol), according to an embodiment of the present invention.

FIG. 7 is a diagram view depicting the utilization of various NIST specifications for SCAP, according to an embodiment of the present invention. In this embodiment, diagram 700 defines SCAP as utilizing various specifications for: (i) vulnerability management, (ii) asset management, (iii) configuration management, and (iv) compliance management. In this example, (i) vulnerability management includes the Common Vulnerabilities and Exposures (CVE)

standard, (ii) asset management includes the Common Platform Enumeration (CPE) standard, (iii) configuration management includes the Common Vulnerability Scoring System (CVSS) standard, the Open Vulnerability and Assessment Language (OVAL) standard, the Common Configuration Enumeration (CCE) standard, and the Extensible Configuration Checklist Description Format (XCCDF) standard; and (iv) compliance management includes Security and Privacy Controls for Federal Information Systems and Organizations (SP 800-53) compliance-related information. Additional standards that may be used include, for example, the Open Checklist Interactive Language (OCIL) standard, the Asset Reporting Format (ARF) standard, the Software Identification (SWID) Tag standard, the Common Configuration Scoring System (CCSS) standard, and the Trust Model for Security Automation Data (TMSAD) standard. (Note: the terms "CVE," "CVSS," "OVAL," and "CCE" may be subject to trademark rights in various jurisdictions throughout the world and are used here only in reference to the products or services properly denominated by the marks to the extent that such trademark rights may exist.)

A fundamental component of many embodiments of the present invention is the continuous quantification calculation of operational risk, using the FAIR Risk Management System for each identified threat event. Various aspects of the FAIR process and its calculation of operational risk will now be discussed.

As implemented in various embodiments, the FAIR process includes several components: (i) a risk component, (ii) a risk management component, and (iii) a feedback loop. In these embodiments, risk is a function of the threats, assets, controls and impact factors (e.g., laws, etc.) that drive loss exposure. Further, in these embodiments, risk management includes both decisions and execution. Decisions are based, for example, on the organization's risk governance. Execution of the decisions then determines actual risk. Still further, in these embodiments, the feedback loop includes critical feedback about the conditions of asset-level controls, metrics related to threat intelligence and losses, metrics regarding conditions that affect execution (e.g., awareness, capabilities) and root-cause analysis data.

Various embodiments of the present invention recognize that quantification is the core of effective cyber risk management, and as such quantification is a main component of QA in many of these embodiments. A FAIR quantitative risk analysis model defines the necessary building blocks for implementing effective cyber risk management programs. FAIR risk management is the combination of personnel, policies, processes, and technologies that enable an organization to cost-effectively achieve and maintain an acceptable level of loss exposure, and was conceived as a way to provide meaningful measurements to enable effective comparisons and well-informed decisions. FAIR has become an international standard Value at Risk (VaR) model for cybersecurity and operational risk.

Risk values calculated utilizing FAIR are typically provided as monetary loss (e.g., $1.35M) for a given frequency (e.g., one year). A formula for calculating risk, utilizing FAIR, according to various embodiments of the present invention, is to multiply probable loss event frequency by probable loss magnitude. Probable loss event frequency can be calculated, for example, by multiplying a threat event frequency by a derived vulnerability. Probable loss magnitude can be calculated, for example, by multiplying a primary loss magnitude by a secondary loss magnitude.

In various embodiments, the threat event frequency (TEF) is the probable frequency within a given timeframe, such as 1 year, that the threat will act in a manner that may result in loss (i.e., how often is the threat applying force against an asset?). One potential source of data for deriving TEF is a web application firewall (WAF). TEF can be estimated directly for many scenarios because systems, network devices, and databases often include logs. There are also other sources of objective data (e.g., Incident Response tickets) which can help estimate TEF directly.

In various embodiments, TEF is calculated in a manner similar to the manner used to calculate the derived vulnerability, discussed below. In various other embodiments, a formula for calculating TEF includes multiplying an encounter frequency by a probability of action. Encounter frequency (EF) is the probable frequency within a given timeframe that a threat will encounter an asset (note: consider if the threat's contact frequency is random, regular, and/or intentional). Probability of action (POA) is expressed as a percentile (%), where POA is the probability that a threat will act against an asset once contact has occurred (note: does not apply towards acts of nature). Some questions used in determining POA can include, for example: (i) What is the threat's perceived value of the asset? (ii) What level of effort will the threat apply? and (iii) How much personal risk will the threat face?

In various embodiments, the derived vulnerability used in calculating the probable loss event frequency is the probability that threat capability is greater than control strength. In other words, in these embodiments, vulnerability is the probability that an asset will be unable to resist the actions of a threat agent. Vulnerability may be expressed as a percentile (%) that represents the percentage of threat events that materialize into actual loss events. Calculating vulnerability typically includes calculating a cumulative control strengths of a particular threat scenario.

In various embodiments, an action that reduces the threat event frequency and/or the derived vulnerability will decrease the probable loss event frequency, and thereby reduce monetary estimates of future loss (also known as "loss exposure"). Annual loss exposures may be reported using the following values, for example: (i) minimum, (ii) maximum, (iii) average, and (iv) most likely.

In various embodiments, threat capability (TCap) is expressed as a percentile (%), where TCap is the probable level of force that a threat can apply against an asset (note: not all threats have the same skill sets nor equal amounts of resources). In various embodiments, control strength (CS), often used interchangeably with resistance strength (RS), is also expressed as a percentile (%), where RS/CS is a measure of the difficulty faced by the threat, considering all of the preventative/protective controls in place. In various embodiments, CS represents the (min/most likely/max) PERT distribution values for the percentage of time that the control will be resistant to attack for a specific community of attackers.

In various embodiments, controls against threats are assessed and/or measured based on their respective effects on the frequency and/or magnitude of loss. Generally speaking, when controls are implemented, a level of risk is reduced or maintained. Some examples of types of controls used include: (i) preventative, (ii) compensating, (iii) detective, (iv) internal, (v) deterrent, (vi) physical, (vii) technical, (viii) process, and (ix) policy.

The FAIR model generally includes four control categories: (i) avoidance, (ii) deterrence, (iii) resistance/vulnerability management, and (iv) responsive. In an embodiment, it is determined that twenty-five system and communications controls are required to best mitigate a communication attack threat. In this embodiment, only the controls classified as resistance controls will be used for an assessment of strengths and weaknesses. The resulting risk calculated for these controls is reported in three probability distributions: minimum, maximum, and most likely.

Various embodiments include FAIR reporting, which includes qualitative scales/ranges and also leverage quantitative analysis, which provides clear reporting with more rigorous analysis. As just an example, a quantified loss magnitude qualitative scale may include: (i) a risk rating of "severe" for loss exposures over $10,000,000, (ii) a risk rating of "high" for loss exposures between $1,000,000 and $9,999,999, (iii) a risk rating of "significant" for loss exposures between $100,000 and $999,999, (iv) a risk rating of "moderate" for loss exposures between $10,000 and $99,999, (v) a risk rating of "low" for loss exposures between $1,000 and $9,999, and (vi) a risk rating of "very low" for loss exposures between $0 and $999.

Various embodiments of the present invention recognize that many theories for modeling activity are based on probability to deal with incomplete information. Fuzzy logic, on the other hand, deals with belief instead of probability/likelihood. Various embodiments of the present invention utilize a two-fold fuzzy set, defined with two membership functions: belief and disbelief. In these embodiments, the CF is determined by taking the difference between belief and disbelief. Using MYCIN, for example, belief and disbelief can be defined as MB[h,e] and MD[h,e], respectively, where "h" is a hypothesis and "e" is evidence.

Various embodiments recognize that belief reliability is a model-based reliability metric which considers both what we know (expressed as reliability models) and what we do not know (expressed as "epistemic uncertainty" in the reliability models) about the reliability. The explicit representation of epistemic uncertainty and belief reliability can be treated as an uncertain measure in uncertainty theory. Therefore, calculating CF for risk can be represented as $CF=\{\mu Belief\ risk(x), \mu Disbelief\ risk(x)\}$.

In various embodiments, uncertainty is associated around real-world data fed to a QA Engine (e.g., QA engine 602) via SCAP (e.g., via SCAP portion 612) and OSCAL (e.g., via OSCAL portion 604). In these embodiments, uncertainty includes properties or features about the data including error, accuracy, validity, quality, and noise. However, it should be noted that incomplete domain knowledge may or may not always result in accurate results. In addition, when data is collected from different sources, it is possible that the data will be noisy and conflicting, where noisy data typically refers to meaningless data and conflicting data typically refers to the contradictory data.

In various embodiments, the QA Engine (e.g., QA engine 602) will establish the Target of Evaluation (TOE) and the baseline scope of the system, by processing all of the following data: a system security plan, a control solution cybersecurity framework, a system test plan, system test results, and asset, configuration, vulnerability and compliance management data. In these embodiments, once the TOE is established, the QA Engine will then be able to calculate CF for every threat event identified in the Risk Management Threat Assessment process, by first calculating the FAIR quantified risk value. The risk value is calculated by processing the following available information forwarded from the SIEM: contact frequency, probably of action, threat event frequency, threat capability, resistance strength, loss event frequency, and loss magnitude. During the FAIR risk analysis process, the QA Engine will aggregate CF by utilizing the two-fold fuzzy set membership functions Belief reliability and Disbelief as described above.

In various embodiments, the CF is calculated by: (i) examining IT control specifications during a control strength (CS) process, (ii) generating a CF for each identified control criteria, and (iii) averaging CF for each threat scenario vulnerability.

Various embodiments of the present invention utilize a FUZZY LOGIC TOOLBOX providing MATLAB functions, apps, and a SIMULINK block for analyzing, designing, and simulating systems based on fuzzy logic. These tools provide functions for many common fuzzy logic-related methods, including fuzzy clustering and adaptive neurofuzzy learning. (Note: the terms "FUZZY LOGIC TOOLBOX," "MATLAB," and "SIMULINK" may be subject to trademark rights in various jurisdictions throughout the world and are used here only in reference to the products or services properly denominated by the marks to the extent that such trademark rights may exist.)

In an embodiment of the present invention, a QA engine (e.g., QA Engine 602) calculates a certainty factor based on a control strength for NIST SP 700-171 control 3.1.1, defined as "Limit system access to authorized users, processes acting on behalf of authorized users, and devices (including other system)." In this embodiment, the QA engine first examines one or more of the following specifications: (i) system configurations settings and associated documentation; (ii) list of active system accounts and the name of the individual associated with each account; (iii) notifications or records of recently transferred, separated, or terminated employees; (iv) list of conditions for group and role membership; (v) list of recently disabled system accounts along with the name of the individual associated with each account; (vi) access authorization records; (vii) account management compliance reviews; (viii) system monitoring records; (ix) system audit logs and records; (x) list of devices and systems authorized to connect to organizational systems; (xi) other relevant documents or records; (xii) account management test results; and (xiii) penetration tests. Then, based on performed tests and the examined specifications, the QA engine determines the certainty factor for the control, building Belief and Disbelief according to one or more of the following criteria: (i) authorized users are identified; (ii) processes acting on behalf of authorized users are identified; (iii) devices (and other systems) authorized to connect to the system are identified; (iv) system access is limited to authorized users; (v) system access is limited to processes acting on behalf of authorized users; and (vi) system access is limited to authorized devices (including other systems).

Generally speaking, belief reliability measures the degree to which a component or a system can perform its function as designed. In this embodiment, belief will be based on what specifications are included and what tests are performed. Missing or incomplete specifications, and/or failing test results, will increase disbelief. The CF is generated for each criterion using the above-described formula of $CF=\{\mu Belief\ risk(x), \mu Disbelief\ risk(x)\}$, and is averaged based on weight factors (WF). The resulting CF is reported for this control. The process is then repeated for all resistance controls pertaining to this vulnerability, and once again averaged based on WF.

In various embodiments, threat capability (TCap) refers to a threat agent's skill (knowledge & experience) and resources (time and materials) and varies depending on the threat agent/community (e.g., cyber criminals, privileged insiders, customers, and nation states). In various embodiments, TCap is estimated relative to the scenario being analyzed, and is reported in the following rates: (i) Very High (VH)—Top 2% when compared against the overall threat population; (ii) High (H)—Top 16% when compared against the overall threat population; (iii) Moderate (M)—Average skill and resources (between bottom 16% and top 16%); (iv) Low (L)—Bottom 16% when compared against the overall threat population; and (v) Very Low (VL)—Bottom 2% when compared against the overall threat population.

Generally speaking, a Monte Carlo simulation is a method for analyzing data that has significant uncertainty. Monte Carlo simulations typically perform repeated random sampling to obtain numerical results. In various embodiments of the present invention, Monte Carlo simulations are performed using the accumulated CS and the pre-determined TCap distributions (e.g., minimum, maximum, and most likely). These values are pre-assigned by each organization, for each threat community, and against each scenario. The output of the Monte Carlo simulations used in risk analysis is shown as probability distributions.

For example, in an embodiment, a QA engine (e.g., QA Engine 602) analyzes the threat of hacktivists compared to a corresponding protect communications control, where TCap represents the threat capability of hacktivists and CS represents the strength of the protect communications control. In this embodiment, Monte Carlo simulations are performed to obtain numerical values for TCap and CS, as shown in the following table.

For example, in an embodiment, a QA engine (e.g., QA Engine 602) analyzes the threat of hacktivists compared to a corresponding protect communications control, where TCap represents the threat capability of hacktivists and CS represents the strength of the protect communications control. In this embodiment, Monte Carlo simulations are performed to obtain numerical values for TCap and CS, as shown in the following table.

TABLE

TCap and CS Simulations

| Simulation | TCap | CS | Vuln |
| --- | --- | --- | --- |
| 1 | 51 | 83 | 0 |
| 2 | 28 | 68 | 0 |
| 3 | 70 | 66 | 1 |
| 4 | 59 | 78 | 0 |
| 5 | 48 | 93 | 0 |
| 6 | 50 | 82 | 0 |
| 7 | 55 | 97 | 0 |
| 8 | 47 | 74 | 0 |
| 9 | 53 | 79 | 0 |
| 10 | 74 | 73 | 1 |

As shown in the table, in this example, ten example Monte Carlo simulations are performed, resulting in two (2) simulations where the value of TCap exceeds the value of CS, resulting in a vulnerability (Vuln) of 1. In the other eight (8) simulations, the value of TCap does not exceed the value of CS, resulting in Vuln of 0. Also, as at least a partial result of these simulations, the QA engine reports probability distributions for TCap and CS as follows: (i) for TCap, minimum 25%, most likely 50%, and maximum 75%; and (ii) for CS, minimum 60%, most likely 80%, and maximum 99%.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving, by one or more processors, information pertaining to a managed asset, wherein the information pertaining to the managed asset includes at least a first subset of information pertaining to known security controls and associated control criteria and a second subset of information pertaining to an operational state of the managed asset;
identifying, by one or more processors, based, at least in part, on the received information: (i) a threat to the managed asset and, (ii) one or more corresponding security controls for mitigating the threat, the security controls having associated control criteria;
utilizing, by one or more processors, a risk assessment engine to calculate a risk value for the threat based, at least in part, on the received information by:
providing, by one or more processors, to the risk assessment engine, the first subset of information;
providing, by one or more processors, to the risk assessment engine, the second subset of information; and
receiving, by one or more processors, from the risk assessment engine, the calculated risk value;
calculating, by one or more processors, a certainty factor for the threat based, at least in part, on a measure of belief associated with the control criteria; and
performing, by one or more processors, a computer-based remediation action based, at least in part, on the risk value and the certainty factor.

2. The computer-implemented method of claim 1, further comprising:
prior to providing the second subset of information to the risk assessment engine, training, by one or more processors, a machine learning component of the risk assessment engine using the first subset of information.

3. The computer-implemented method of claim 1, further comprising:
prior to providing the first subset of information to the risk assessment engine, converting, by one or more processors, the first subset of information into Open Security Controls Assessment Language (OSCAL) format.

4. The computer-implemented method of claim 3, wherein the first subset of information includes: (i) security control information; (ii) a system security plan; and (iii) a system test plan.

5. The computer-implemented method of claim 1, further comprising:
prior to providing the second subset of information to the risk assessment engine, converting, by one or more processors, the second subset of information using Security Content Automation Protocol (SCAP).

6. The computer-implemented method of claim 5, wherein the second subset of information is received from a security information and event management (SIEM) system.

7. The computer-implemented method of claim 5, wherein the second subset of information includes: (i) contact frequency information; (ii) probability of action information; (iii) threat event frequency and capability information; (iv) resistance strength information; and (v) loss event frequency and magnitude information.

8. The computer-implemented method of claim 1, wherein the calculating of the certainty factor is further based, at least in part, on a two-fold fuzzy set that includes a membership function for belief of the control criteria and a membership function for disbelief of the control criteria.

9. The computer-implemented method of claim 8, wherein the calculating of the certainty factor further comprises:
calculating, by one or more processors, the measure of belief associated with the control criteria based, at least in part, on the membership function for belief of the control criteria;
calculating, by one or more processors, a measure of disbelief associated with the control criteria based, at least in part, on the membership function for disbelief of the control criteria; and
calculating, by one or more processors, a difference between the measure of belief for the control criteria and the measure of disbelief for the control criteria.

10. A computer program product comprising one or more computer readable storage media and program instructions collectively stored on the one or more computer readable storage media, the program instructions executable by one or more processors to cause the one or more processors to perform a method comprising:
receiving information pertaining to a managed asset, wherein the information pertaining to the managed asset includes at least a first subset of information pertaining to known security controls and associated control criteria and a second subset of information pertaining to an operational state of the managed asset;
identifying, based, at least in part, on the received information: (i) a threat to the managed asset and, (ii) one or more corresponding security controls for mitigating the threat, the security controls having associated control criteria;

utilizing a risk assessment engine to calculate a risk value for the threat based, at least in part, on the received information by:
training a machine learning component of the risk assessment engine using the first subset of information;
providing, to the risk assessment engine, the second subset of information; and
receiving, from the risk assessment engine, the calculated risk value;
calculating a certainty factor for the threat based, at least in part, on a measure of belief associated with the control criteria; and
performing a computer-based remediation action based, at least in part, on the risk value and the certainty factor.

11. The computer program product of claim 10, wherein the method further comprises:
prior to training the machine learning component of the risk assessment engine using the first subset of information, converting the first subset of information into Open Security Controls Assessment Language (OSCAL) format; and
prior to providing the second subset of information to the risk assessment engine, converting the second subset of information using Security Content Automation Protocol (SCAP).

12. The computer program product of claim 10, wherein the calculating of the certainty factor is further based, at least in part, on a two-fold fuzzy set that includes a membership function for belief of the control criteria and a membership function for disbelief of the control criteria.

13. The computer program product of claim 12, wherein the calculating of the certainty factor further comprises:
calculating the measure of belief associated with the control criteria based, at least in part, on the membership function for belief of the control criteria;
calculating a measure of disbelief associated with the control criteria based, at least in part, on the membership function for disbelief of the control criteria; and
calculating a difference between the measure of belief for the control criteria and the measure of disbelief for the control criteria.

14. A computer system comprising:
one or more processors; and
one or more computer readable storage media;
wherein:
the one are more processors are structured, located, connected and/or programmed to execute program instructions collectively stored on the one or more computer readable storage media; and
the program instructions, when executed by the one or more processors, cause the one or more processors to perform a method comprising:
receiving information pertaining to a managed asset, wherein the information pertaining to the managed asset includes at least a first subset of information pertaining to known security controls and associated control criteria and a second subset of information pertaining to an operational state of the managed asset;
identifying, based, at least in part, on the received information: (i) a threat to the managed asset and, (ii) one or more corresponding security controls for mitigating the threat, the security controls having associated control criteria;

utilizing a risk assessment engine to calculate a risk value for the threat based, at least in part, on the received information by:
  training a machine learning component of the risk assessment engine using the first subset of information;
  providing, to the risk assessment engine, the second subset of information; and
  receiving, from the risk assessment engine, the calculated risk value;
calculating a certainty factor for the threat based, at least in part, on a measure of belief associated with the control criteria; and
performing a computer-based remediation action based, at least in part, on the risk value and the certainty factor.

15. The computer system of claim 14, wherein the method further comprises:
prior to training the machine learning component of the risk assessment engine using the first subset of information, converting the first subset of information into Open Security Controls Assessment Language (OSCAL) format; and
prior to providing the second subset of information to the risk assessment engine, converting the second subset of information using Security Content Automation Protocol (SCAP).

16. The computer system of claim 14, wherein the calculating of the certainty factor is further based, at least in part, on a two-fold fuzzy set that includes a membership function for belief of the control criteria and a membership function for disbelief of the control criteria.

17. The computer system of claim 16, wherein the calculating of the certainty factor further comprises:
calculating the measure of belief associated with the control criteria based, at least in part, on the membership function for belief of the control criteria;
calculating a measure of disbelief associated with the control criteria based, at least in part, on the membership function for disbelief of the control criteria; and
calculating a difference between the measure of belief for the control criteria and the measure of disbelief for the control criteria.

* * * * *